United States Patent
Kirby et al.

(10) Patent No.: US 8,803,941 B2
(45) Date of Patent: Aug. 12, 2014

(54) METHOD AND APPARATUS FOR HANDS-FREE CONTROL OF A FAR END CAMERA

(75) Inventors: Shaun Kirby, Pasadena, CA (US); Dave Evans, Los Altos Hills, CA (US); Kristopher Charles Linquist, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 522 days.

(21) Appl. No.: 13/161,404

(22) Filed: Jun. 15, 2011

(65) Prior Publication Data

US 2012/0320147 A1    Dec. 20, 2012

(51) Int. Cl.
 *H04N 7/14* (2006.01)
(52) U.S. Cl.
 USPC ..................... 348/14.08; 348/14.05
(58) Field of Classification Search
 USPC ....................... 348/14.01, 14.08, 14.05, 14.16
 See application file for complete search history.

(56) References Cited

U.S. PATENT DOCUMENTS

| | | | |
|---|---|---|---|
| 7,312,809 B2 * | 12/2007 | Bain et al. | 348/14.05 |
| 7,321,384 B1 * | 1/2008 | Wu et al. | 348/14.08 |
| 2012/0120183 A1 * | 5/2012 | Gagneraud | 348/14.08 |
| 2012/0320141 A1 * | 12/2012 | Bowen et al. | 348/14.02 |

* cited by examiner

*Primary Examiner* — Olisa Anwah
(74) *Attorney, Agent, or Firm* — Patterson & Sheridan, LLP

(57) ABSTRACT

One embodiment of the present invention sets forth a method for intuitively controlling a far-end camera via physical movements. The method includes the steps of receiving an image captured by a first camera and including a digital representation of at least a portion of a user of the first camera, analyzing the digital representation to identify a position of the user relative to the first camera, computing a value associated with a first property of a second camera based on the position of the user, and transmitting the value to the second camera, wherein, in response to receiving the value, a perspective of the second camera is modified based on the value.

20 Claims, 4 Drawing Sheets

METHOD AND APPARATUS FOR HANDS-FREE CONTROL OF A FAR END CAMERA

BACKGROUND OF THE INVENTION

1. Field of the Invention

The present disclosure relates generally to video communication.

2. Description of the Related Art

Video conferencing involves audio and video telecommunications infrastructures via which different users can communicate with one another. A video conferencing system can be between two people (point-to-point) or involve several sites (multi-point) with more than one person in large rooms at different sites. Besides the audio and visual transmission, video conferencing can be used to share documents, computer-displayed information, and whiteboards.

In recent times, video conferencing has become an essential tool for better communication and collaboration. At the high end, video conferencing solutions provide an experience for remote human interaction that approaches that of in-person interaction.

BRIEF DESCRIPTION OF THE FIGURES

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF EXAMPLE EMBODIMENTS

Figure 1:
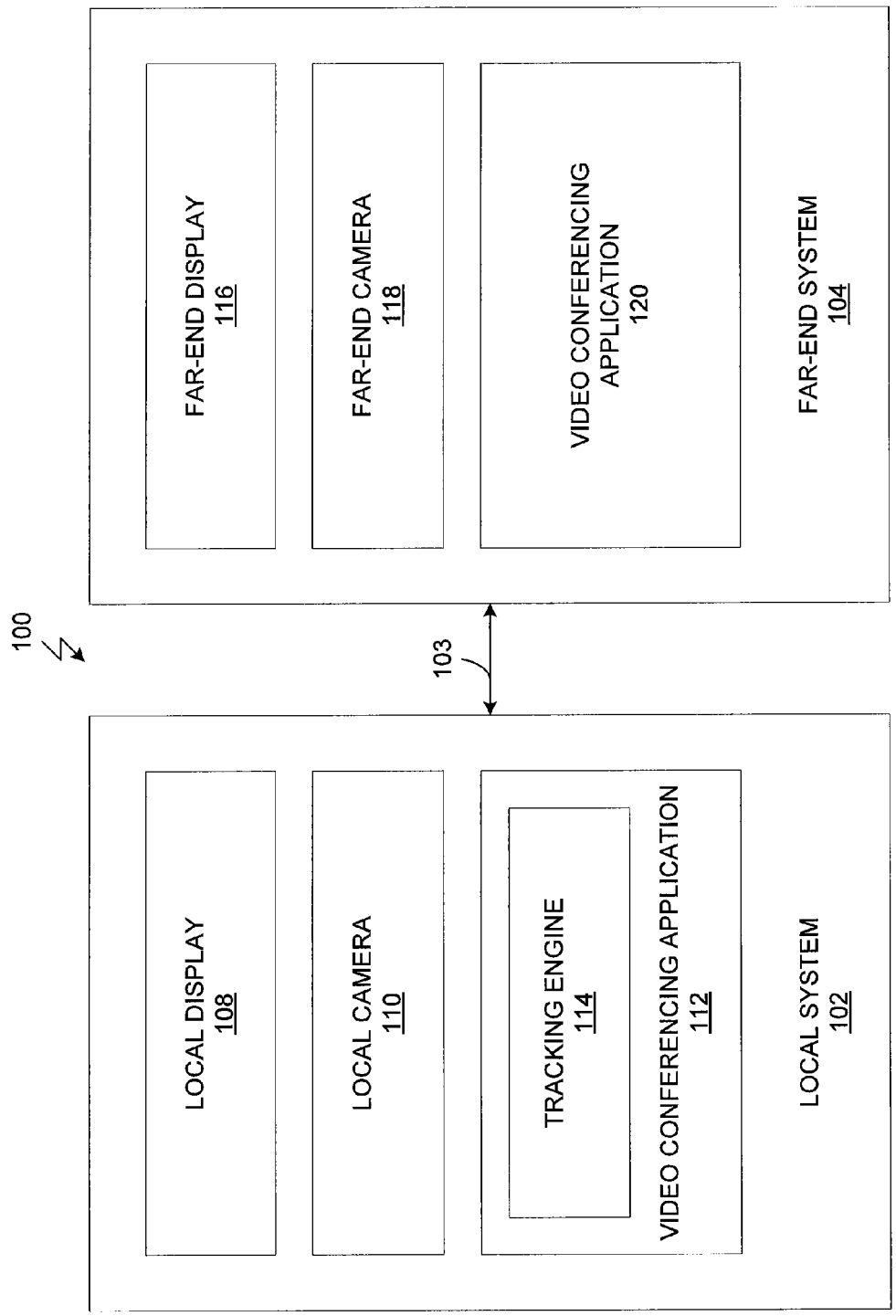
FIG. 1 illustrates a video conferencing architecture according to one embodiment of the invention.

FIG. 1 illustrates a video conferencing architecture 100 according to one embodiment of the invention. As shown, the video conference architecture 100 includes a local system 102 and a far-end system 104 connected via a communications link 103.

The communications link 103 includes a plurality of network communications systems, such as routers and switches, configured to facilitate data communication between the local system 102 and the far-end system 104. Persons skilled in the art will recognize that many technically feasible techniques exist for building the communications link 103, including technologies practiced in deploying the well-known internet communications network.

The local system 102 includes a local display 108, a local camera 110, and a video conferencing application 112 that includes a tracking engine 114. The video conferencing application 112 is a software application that is configured to enable the local system and far-end system to transmit video images of corresponding surroundings via the communications link 103. The local system 102 is operated, at least in part, by an "observer" who views, on the local display 108, images received from the far-end system 104 via the communications link 103 and the video conferencing application 112. The local display 108 comprises any technically feasible means for generating an image for display. For example, the local display 108 may be fabricated using liquid crystal display (LCD) technology, cathode-ray technology, and light-emitting diode (LED) display technology (either organic or inorganic). In addition, images of the observer and the real-world surroundings of the observer captured by the local camera 110 are transmitted to the video conferencing application 112 for processing and, optionally, for transmission to the far-end system 104.

The far-end system 104 includes a far-end display 116, a far-end camera 118, and a video conferencing application 120. The video conferencing application 120 is a software application similar to the video conferencing application 120 and is configured to enable the far-end system 104 and local system 102 to transmit video images of corresponding surroundings via the communications link 103. The far-end system 104 is operated, at least in part, by a subject who optionally views, on the far-end display 116, images received from the local system 102 via the communications link 103 and the video conferencing application 120. The far-end display 116 comprises any technically feasible means for generating an image for display. For example, the far-end display 116 may be fabricated using liquid crystal display (LCD) technology, cathode-ray technology, and light-emitting diode (LED) display technology (either organic or inorganic). In addition, images of the subject and the real-world surroundings of the subject captured by the far-end camera 118 are transmitted to the video conferencing application 120 for processing and for transmission to the local system 102.

In operation, the observer controls the far-end camera 118 included in the far-end system 104 via various physical movements that are captured, analyzed and translated into camera movements by the tracking engine 114. The far-end camera 118 has several properties, such as zoom, pan and tilt, that affect the perspective of the view captured by the far-end camera 118. For example, modifying the value associated with the zoom property causes the far-end camera 118 to zoom in on the current view. Thus, to control the view captured by the far-end camera 118, the observer uses intuitive motions, such as coming closer to the local camera 110, that are captured by the tracking engine 114 and translated into values of the properties of the far-end camera 118.

Figure 2:
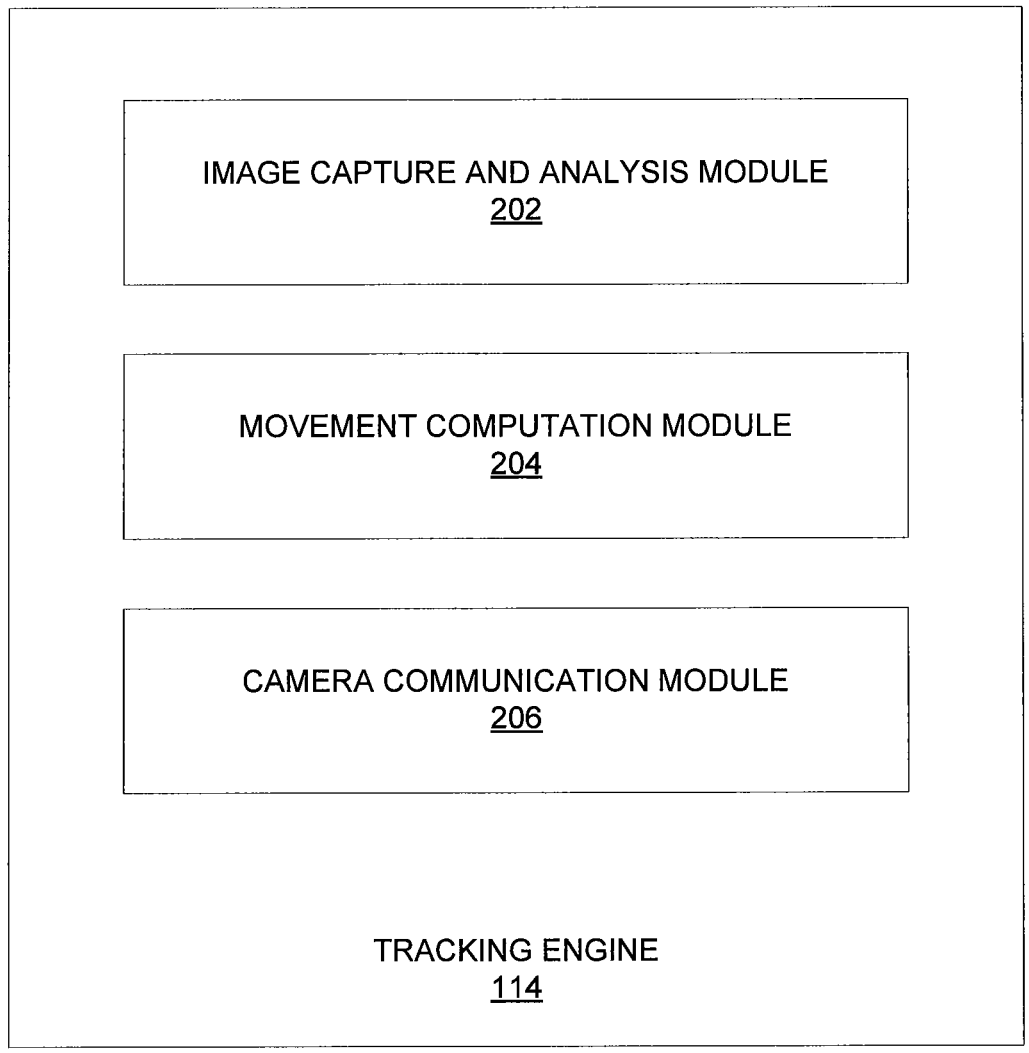
FIG. 2 illustrates a more detailed view of the tracking engine of FIG. 1, according to one embodiment of the invention.

FIG. 2 illustrates a more detailed view of the tracking engine 114 of FIG. 1, according to one embodiment of the invention. The tracking engine 114 includes an image capture and analysis module 202, a movement computation module 204 and a camera communication module 206.

The tracking engine 114 applies computer vision techniques to images of the observer captured via the local camera 110 to determine the position of, at least a portion, of the observer. In one embodiment, only the position of the head of the observer is tracked. The determined position includes both the lateral location of the observer in the plane of the local camera 110 and the distance from the local camera 110.

In operation, the image capture and analysis module 202 captures images at a pre-identified rate from the local camera 110 for processing. For each image to be processed, the image capture and analysis module 202 first scales the image down to a size that can be processed efficiently in real-time. In one embodiment, such a scaling operation is optional because the processing capabilities of the local system 102 are sufficient to process the image without any scaling. The image capture and analysis module 202 then applies a face detection technique, such as a Haar classifier, to detect the position of the face of the observer relative to the local camera 110. Three different components of the position are determined. First is the distance of the center of the face above or below the center of the entire captured image. Second is the distance of the center of the face left or right of the center of the entire captured image. Third is the distance of the face from the local camera 110. In one embodiment, the size of the face relative to the rest of the captured image indicates the distance of the face of the observer from the local camera 110.

In one embodiment, if more than one face is detected in the captured image, then the face of the observer is defined to be the largest face or the face whose coordinates are reached first in a raster scan from the upper left corner of the captured image when two or more faces of exactly the same size (larger than all other detected faces) are detected.

Once the position of the face based on the above-mentioned three components is determined, the movement computation module 204 computes values for the zoom, pan and tilt properties of the far-end camera 118 that reflect the position of the face. The zoom value is based on the distance of the face from the local camera 110. In one embodiment, the zoom value is determined based on a configurable parameter that indicates the maximum distance the face can be from the local camera 110 to cause the maximum zoom factor. The zoom value is thus computed based on the current distance from the local camera 110 relative to the maximum distance. In other embodiments, more configurable parameters may impact the zoom value such that the observer can experience exaggerated zoom, allowing him/her to gain a very detailed perspective of the subject with minimal movement toward the camera.

The pan value is computed based on the position of the face left or right of the center of the entire captured image, and the tilt value is computed based on the position of the face above or below the center of the entire captured image. Again, for both the pan value and the tilt value, configurable parameters that indicate a relationship between the maximum distances and the maximum pan/tilt values may be used to compute the pan/tilt values.

In one embodiment, the range of the pan and tilt values can be tied to the zoom value, such that, as the observer comes closer to the local camera 110 (and the zoom value increases proportionally), the pan and tilt values decrease. Such a technique allows the observer to have more granular control over the far-end camera 118 and an increased effect of 3D realism.

The movement computation module 204 also optionally applies a noise reduction technique to the computed zoom, pan and tilt values so that the far-end camera 118 is not jerky and the perspective is not shaky when the observer is actually stationary. Any noise reduction technique well-known in the art can be applied by the movement computation module 204. In one embodiment, zoom, pan and tilt values across previous frames are stored within the tracking engine 114, and the movement computation module 204 compares the computed zoom, pan and tilt values against the prior values. If, in such a comparison, the difference between the currently computed value and the previously computed value is not above a predetermined threshold, then the movement computation module 204 determines that the value does not need to be applied to the far-end camera 118. In such a scenario, a future image that is processed could result in a value that is to be applied to the far-end camera 118.

The computed values, optionally corrected for noise, are then transmitted to the far-end camera 118 via the camera communication module 206. The camera communication module 206 implements a protocol that is understood by the far-end camera 118. In one embodiment, the values are transmitted via transmission control protocol (TCP)/internet protocol (IP) socket(s). Once received, the values transmitted by the camera communication module 206 are processed by the far-end camera 118 and result in the modification of the view captured by the far-end camera 118. In such a manner, the observer controls the far-end camera 118 via various physical movements that are captured, analyzed and translated into camera movements by the tracking engine 114. In one embodiment, the far-end camera 118 is mounted on a pan-tilt turret, and the pan and tilt values transmitted by the camera communication module 206 cause the modification of the position of the pan-tilt turret.

In another embodiment, other movements of the observer can be tracked and corresponding values computed. For example, the observer moving his/her head to the left or right edge of the field of view of the local camera 110 may cause the far-end camera 118 to perform continuous rotation.

Changing the orientation of far-end cameras in response to the position of the face of the observer produces a three-dimensional perspective effect that enhances the realism of the interaction. Such a technique can be used in various video conferencing scenarios, such as a physician examining a patient, security personnel scoping out and zooming in on suspicious activity, etc.

Figure 3:
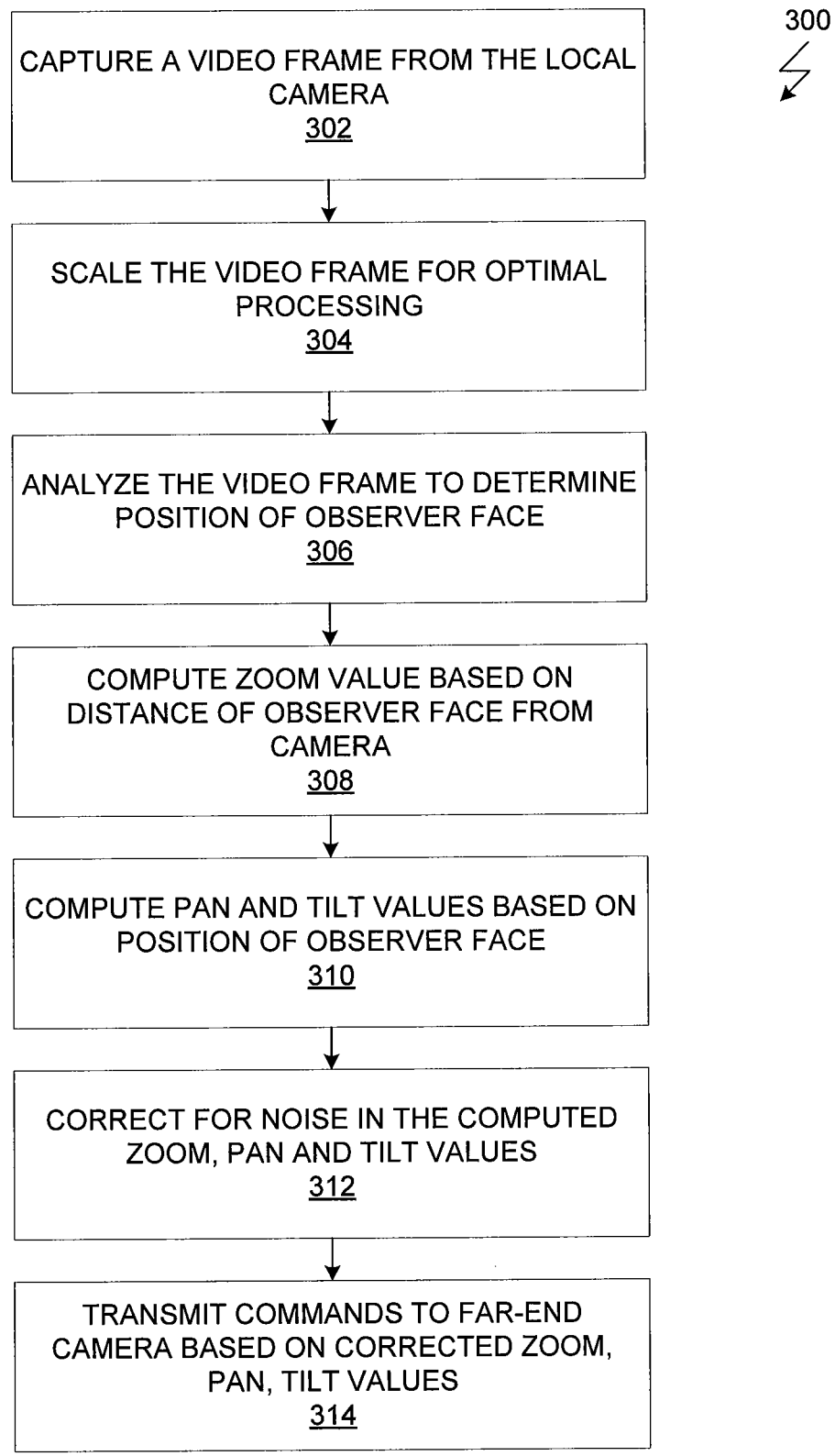
FIG. 3 is a flow diagram of method steps for controlling a far-end camera based on an image captured from the local camera, according to one embodiment of the invention.

FIG. 3 is a flow diagram of method steps for controlling a far-end camera based on an image captured from the local camera, according to one embodiment of the invention. Although the method steps are described in conjunction with the systems of FIGS. 1-2, persons skilled in the art will understand that any system configured to perform the method steps, in any order, is within the scope of the inventions.

The method 300 begins at step 302, where the image capture and analysis module 202 captures an image from the local camera 110 for processing. At step 304, the image capture and analysis module 202 scales the image down to a size that can be processed efficiently in real-time. At step 306, the image capture and analysis module 202 applies a face detection technique, such as a Haar classifier, to detect the position of the face of the observer relative to the local camera 110. Three different components of the position are determined. First is the distance of the center of the face above or below the center of the entire captured image. Second is the distance of the center of the face left or right of the center of the entire captured image. Third is the distance of the face from the local camera 110.

At step 308, the movement computation module 204 computes a value for the zoom property of the far-end camera 118 based on the distance of the face from the local camera 110. At step 310, the movement computation module 204 computes values of pan and tilt properties of the far-end camera 118. The pan value is computed based on the position of the face left or right of the center of the entire captured image, and the tilt value is computed based on the position of the face above or below the center of the entire captured image. At step 312, the movement computation module 204 applies a noise reduction technique to the computed zoom, pan and tilt values so that the far-end camera 118 is not jerky and the perspective is not shaky when the observer is actually stationary.

At step 314, the camera communication module 206 transmits the zoom, pan and tilt values to the far-end camera 118 via a protocol that is understood by the far-end camera 118.

Figure 4:
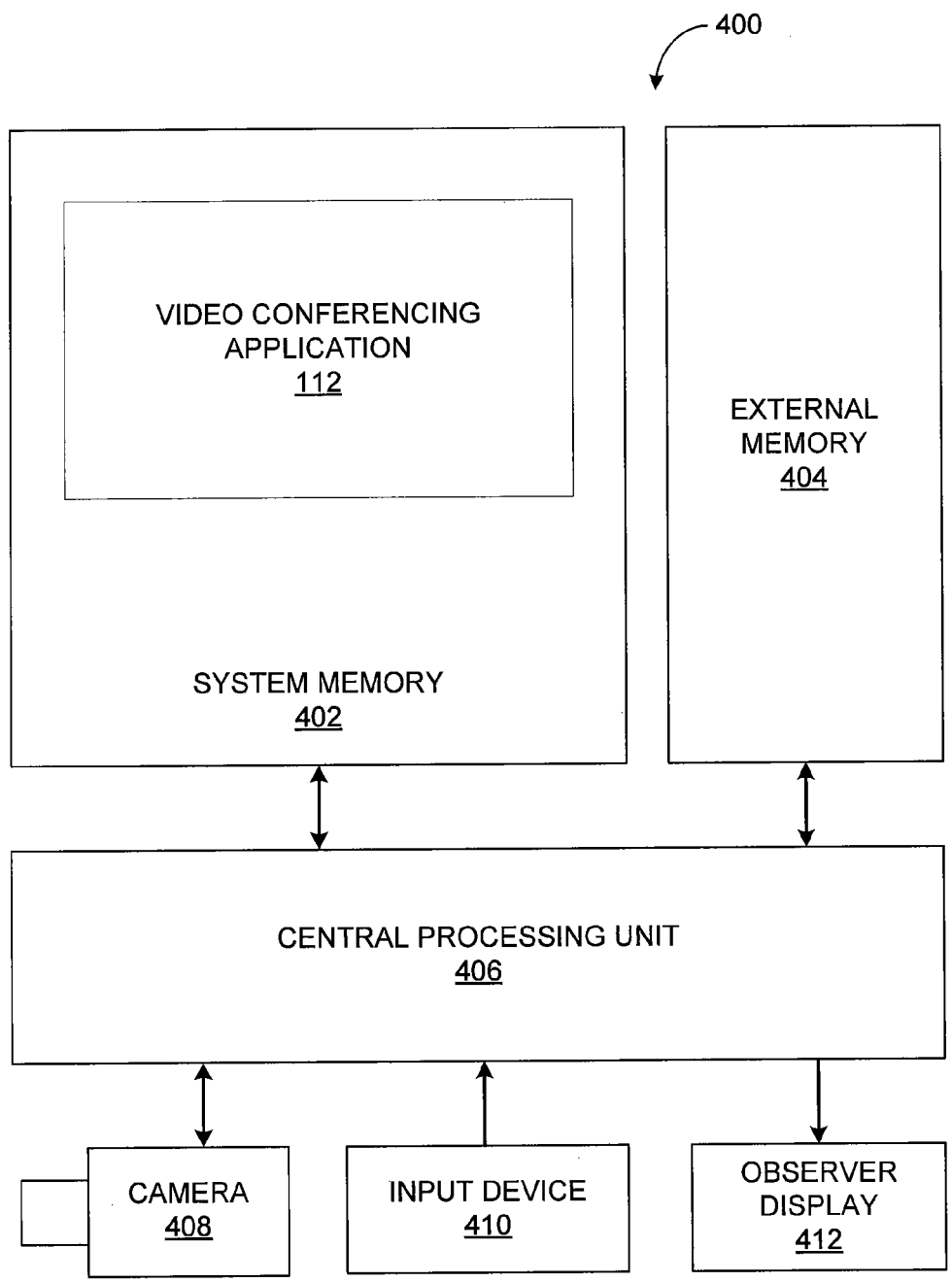
FIG. 4 is an exemplary system within which the video conferencing application of FIG. 1 could execute, according to one embodiment of the invention.

FIG. 4 is an exemplary system within which the video conferencing application 112 of FIG. 1 could execute, according to one embodiment of the invention. As shown, the system 400 includes a system memory 402, an external memory 404, a central processing unit (CPU) 406, a video camera 408, an input device 410 and an observer display device 412.

The system memory 402 includes the video conferencing application 112 previously described herein. The system memory 402 is a memory space, usually a random access memory (RAM), that temporarily stores software programs running within the system 400 at any given time. The CPU 406 executes a sequence of stored instructions associated with and/or transmitted from the various elements in the computer system 400. The external memory 404 is a storage device, e.g. a hard disk, for storing data associated with the video conferencing application 112. The video camera 408 is a video capturing device, e.g. a webcam, or a digital video camera, that allows the end-user operating the video conferencing application 112 to capture video frames of the real-world scene. The input device 410 is an end-user controlled input device, e.g. a mouse or keyboard, that allows a user to manipulate various aspects of the video conferencing application 112. The display device 412 may be a cathode-ray tube (CRT), a liquid crystal display (LCD) or any other type of display device.

Advantageously, the far-end camera control technique described herein allows the observer to intuitively control the far-end camera via physical movements without the use of any additional devices.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Another embodiment of the invention may be implemented as a program product deployed for use over a network. In such an embodiment, the program product may be accessed via a web browser.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

We claim:

1. A method, comprising:
   receiving an image captured by a first camera and including a digital representation of at least a portion of a user of the first camera;
   analyzing the digital representation to identify a position of the user relative to the first camera;
   computing a value associated with a first property of a second camera based on the position of the user; and
   transmitting the value to the second camera, wherein, in response to receiving the value, a perspective of the second camera is modified based on the value.

2. The method of claim 1, wherein the first camera is coupled to a local video conferencing system, and the second camera is coupled to a remote video conferencing system.

3. The method of claim 2, further comprising scaling a size of the image captured by the first camera to a pre-determined size based on one or more image processing capabilities of the local video conferencing system.

4. The method of claim 1, wherein a first component of the position of the user is a distance of the user from the first camera, and analyzing the digital representation comprises computing a ratio of a size of the digital representation of the user included in the image to a total size of the image to determine the distance of the user from the first camera.

5. The method of claim 4, wherein the first property of the second camera comprises a zoom property, and the value associated with the zoom property is computed based on the distance of the user from the first camera.

6. The method of claim 1, wherein analyzing comprises identifying a first centroid of the digital representation and a second centroid of the image.

7. The method of claim 6, wherein the first property of the second camera comprises a pan property, and the value associated with the pan property is computed based on a distance between the first centroid and the second centroid in an x-axis.

8. The method of claim 6, wherein the first property of the second camera comprises a tilt property, and the value associated with the tilt property is computed based on a distance between the first centroid and the second centroid in a y-axis.

9. The method of claim 1, further comprising computing a difference between the value and a previously-computed value prior to transmitting the value associated with the first property to the second camera, and correcting the value associated with the first property for noise based on the difference when the difference is less than a pre-determined threshold.

10. The method of claim 1, wherein the image also includes a digital representation of at least a portion of a second user, and further comprising determining that the user of the first camera is a primary user when a size of the digital representation of the at least the portion of the user is larger than a size of the digital representation of the at least the portion of the second user.

11. A non-transitory computer-readable medium including instructions that, when executed by a processing unit, cause the processing unit to perform operations, the operations comprising:
    receiving an image captured by a first camera and including a digital representation of at least a portion of a user of the first camera;
    analyzing the digital representation to identify a position of the user relative to the first camera;
    computing a value associated with a first property of a second camera based on the position of the user; and
    transmitting the value to the second camera, wherein, in response to receiving the value, a perspective of the second camera is modified based on the value.

12. The non-transitory computer-readable medium of claim 11, wherein the first camera is coupled to a local video conferencing system, and the second camera is coupled to a remote video conferencing system.

13. The non-transitory computer-readable medium of claim 12, wherein the operations further comprise scaling a size of the image captured by the first camera to a pre-determined size based on one or more image processing capabilities of the local video conferencing system.

14. The non-transitory computer-readable medium of claim 11, wherein a first component of the position of the user is a distance of the user from the first camera, and analyzing the digital representation comprises computing a ratio of a size of the digital representation of the user included in the image to a total size of the image to determine the distance of the user from the first camera.

15. The non-transitory computer-readable medium of claim 14, wherein the first property of the second camera comprises a zoom property, and the value associated with the zoom property is computed based on the distance of the user from the first camera.

16. The non-transitory computer-readable medium of claim 11, wherein analyzing comprises identifying a first centroid of the digital representation and a second centroid of the image.

17. The non-transitory computer-readable medium of claim 16, wherein the first property of the second camera comprises a pan property, and the value associated with the pan property is computed based on a distance between the first centroid and the second centroid in an x-axis.

18. The non-transitory computer-readable medium of claim 16, wherein the first property of the second camera comprises a tilt property, and the value associated with the tilt property is computed based on a distance between the first centroid and the second centroid in a y-axis.

19. The non-transitory computer-readable medium of claim 11, wherein the operations further comprise computing a difference between the value and a previously-computed value prior to transmitting the value associated with the first property to the second camera, and correcting the value associated with the first property for noise based on the difference when the difference is less than a pre-determined threshold.

20. A system, comprising:
a remote camera; and
a conferencing application coupled to the remote camera and configured to:
receive an image captured by a first camera and including a digital representation of at least a portion of a user of the first camera,
analyze the digital representation to identify a position of the user relative to the first camera,
compute a value associated with a first property of a second camera based on the position of the user, and
transmit the value to the second camera, wherein, in response to receiving the value, a perspective of the second camera is modified based on the value.

\* \* \* \* \*